US006937595B2

(12) United States Patent
Barzegar et al.

(10) Patent No.: US 6,937,595 B2
(45) Date of Patent: Aug. 30, 2005

(54) MULTIFUNCTION INTERFACE FACILITY CONNECTING WIDEBAND MULTIPLE ACCESS SUBSCRIBER LOOPS WITH VARIOUS NETWORKS

(75) Inventors: Farhad Barzegar, Hillsborough Township, Somerset County, NJ (US); Irwin Gerszberg, Kendall Park, NJ (US); Philip Andrew Treventi, Murray Hill, NJ (US)

(73) Assignee: AT&T Corp., New York, NY (US)

( * ) Notice: Subject to any disclaimer, the term of this patent is extended or adjusted under 35 U.S.C. 154(b) by 905 days.

(21) Appl. No.: 09/871,648

(22) Filed: Jun. 4, 2001

(65) Prior Publication Data

US 2001/0028644 A1 Oct. 11, 2001

Related U.S. Application Data

(63) Continuation of application No. 09/001,422, filed on Dec. 31, 1997, now Pat. No. 6,363,079.

(51) Int. Cl.[7] .............................................. H04L 12/66
(52) U.S. Cl. ..................................... 370/352; 370/465
(58) Field of Search ................................ 370/465, 493, 370/494, 495, 351, 352, 353, 354, 355, 356, 400, 401, 404, 405, 406, 419, 420, 421, 261, 264, 270, 359, 389, 402

(56) References Cited

U.S. PATENT DOCUMENTS 5,613,191 A    3/1997    Hylton et al.
5,630,204 A    5/1997    Hylton et al.
5,949,763 A *  9/1999    Lund ........................... 370/261
6,144,659 A * 11/2000    Nye et al. .................... 370/359
6,215,796 B1 * 4/2001    Smith, Jr. ..................... 370/493

* cited by examiner

Primary Examiner—Phirin Sam
(74) Attorney, Agent, or Firm—Michael Haynes PLC

(57) ABSTRACT

An device, called a facilities management platform (FMP) connects current digital and analog carrier networks and packet switched networks of interexchange carriers with high speed multiple access subscriber links implemented over twisted pair lines. The subscriber line is terminated by an access module containing one or more modems. In preferred embodiments, the modems are high-speed digital tethered vial radio channel or xDSL modems. The FMP interface applies and receives signaling and voice through a digital loop carrier (DLC) via a multiplexer connected directly to the DLC backplane. The multiplexer is controlled by a controller of an access module. It translates data from the subscriber link to the form compatible with the digital backplane to create the appearance of one or more line cards. The FMP also may contain a sound generator to allow it to handle calls through an analog carrier network. The FMP, through the same access module transmits data to and from the modems directly through connected digital networks, such as ATM or SONET, of an interexchange carrier. Through this interface, different network companies can offer competing products through different networks all seamlessly connected through a high speed subscriber line.

3 Claims, 7 Drawing Sheets

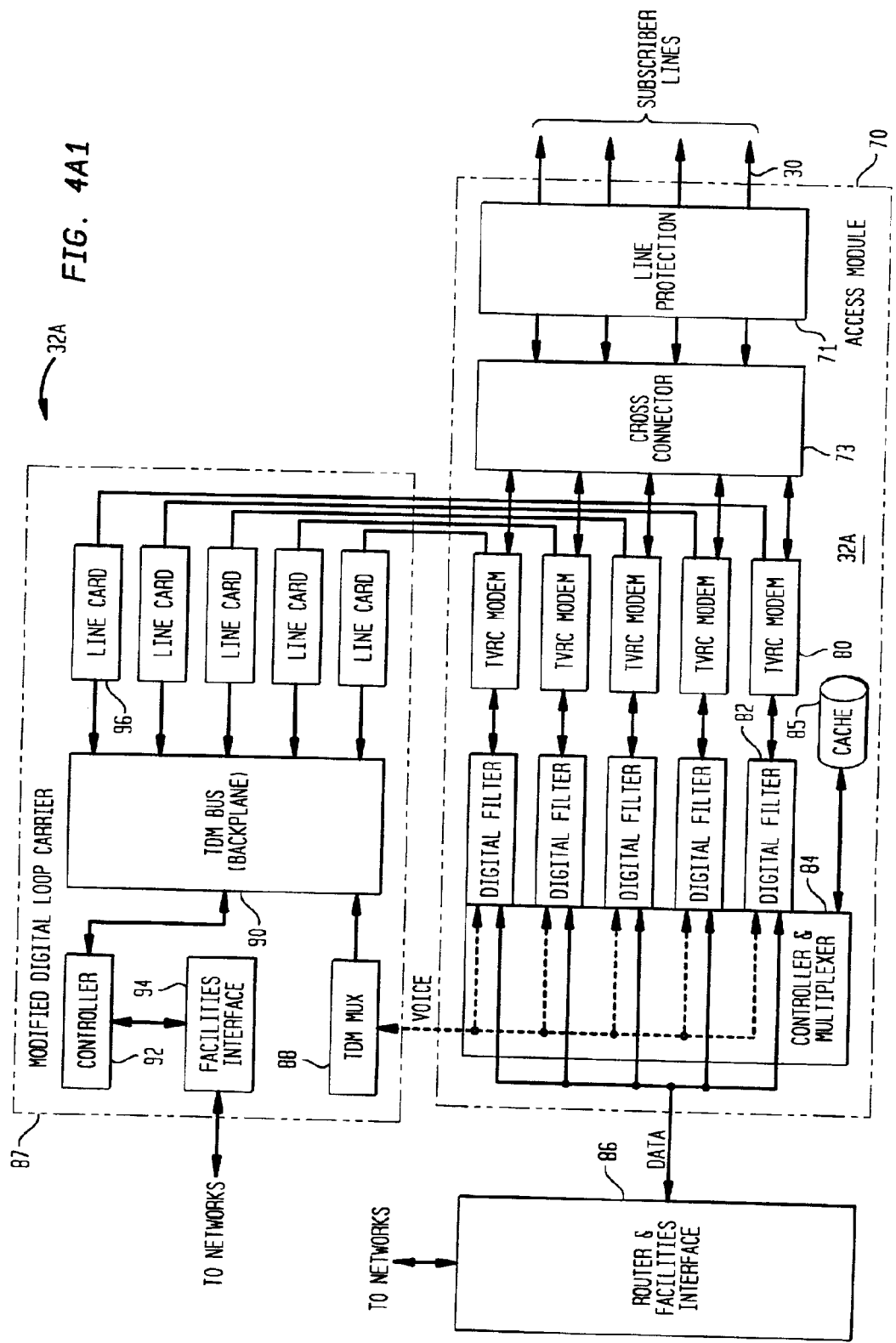

MULTIFUNCTION INTERFACE FACILITY CONNECTING WIDEBAND MULTIPLE ACCESS SUBSCRIBER LOOPS WITH VARIOUS NETWORKS

This application is a continuation of U.S. patent application Ser. No. 09/001,422, filed Dec. 31, 1997 now U.S. Pat. No. 6,363,079, by the same inventors and similarly titled.

FIELD OF THE INVENTION

This invention discloses a wideband communications link layer interface between the digital networks employed by interexchange carriers and new wideband local loop systems connecting subscribers. For example, the invention relates to an interface for tethered radio channel (e.g., digital subscriber loops) local loops to homes and businesses that provide multiple voice and data channels over twisted pair media.

BACKGROUND OF THE INVENTION

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the DSL modem provided by the local telephone company must also be provided to the end user in the customer premises equipment (CPE). Additionally, since the network is not completely controlled by the interexchange companies, it is difficult to for the interexchange companies to provide data at committed deliver rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to allow the interexchange companies to offer more products and services to customers. DSL technology, one type of communication system that can use conventional twisted pair wiring, for which a large infrastcture is in place, holds the promise of providing high bandwidth communication into any telephone subscriber's home or business. However, support for such high speed communication between the existing and future networks and the local high speed loops present major problems: For example, how can such new technology be interfaced with existing and future interexchange carrier equipment and software in a way that allows future growth? How do existing services, such as voice, facsimile, and modem communications fit into the scheme if the twisted pair formerly used for such purposes is co-opted by a new DSL-based system (for example)? How can such an interface take full advantage of the promise of wide-band connection to homes and businesses without being hamstrung by the need to interface with conventional technology? How can the huge burden of wide-band communication to subscriber's premises be handled by interexchange carriers? For example, if people can watch movies at home, how can numerous moves be transmitted from far-flung sites without overtaxing even future interexchange carrier infrastructure?

SUMMARY OF THE INVENTION

In order to provide an improved network, it is desirable for the interexchange companies to have access to at least one of the twisted-pair lines connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can offer better services by providing higher bandwidth, improving the capabilities of the customer premises equipment, and lowering overall system costs to the customer by enhancing competition between local exchange carriers and interexchange carriers.

The new architecture may utilize a video phone and/or other devices to provide new services to an end user, an intelligent services director (ISD) disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

As part of this system, one aspect of the invention provides a so-called FMP which provides a link between the local loop to the customer premises ISD (which may also be located remotely from the customer premises) and the interexchange company network.

Briefly, in summary, the FMP connects current digital and analog carrier networks and packet switched networks of interexchange carriers with high speed multiple access subscriber links implemented over twisted pair lines. The subscriber line is terminated by an access module containing one or more modems. In preferred embodiments, the modems are high-speed digital tethered virtual radio channel or xDSL modems. The interface applies and receives signaling and voice through a digital loop carrier (DLC) via a multiplexer connected directly to the DLC backplane. The multiplexer is controlled by a controller of an access module. It translates data from the subscriber link to the form compatible with the digital backplane to create the appearance of one or more line cards. The FMP also may contain a sound generator to allow it to handle calls through an analog carrier network. The FMP, through the same access module transmits data to and from the modems directly through connected digital networks, such as ATM or SONET, of an interexchange carrier. Through this interface, different network companies can offer competing products through different networks all seamlessly connected through a high speed subscriber line.

According to one embodiment, the invention is a telecommunications interface for communicating subscriber data containing voice, and signaling, and user data between (1) a digital network, (2) a digital loop carrier having an analog interface to connect telephones and a digital circuit connecting the telephone switch to other telephone switches, and (3) a subscriber link to equipment at a subscriber's premise. The interface has a controller and a modem. The modem modulates and demodulates the subscriber data to and from the subscriber link to generate a digital stream containing the voice, and signaling, and user data. A digital filter separates the voice data from the digital stream. The controller applies the voice data to the digital circuit when the signaling data indicates the voice data is to be transmitted by the digital circuit. When the signaling data indicates the voice data is to be transmitted over the digital network, however, the controller applies the voice data to the digital network.

According to another embodiment, the invention is a central office interface between a multiple access link, established over a single twisted pair metallic interface, to a subscriber premises and a local carrier network A digital loop carrier with a digital interface permits access to a digital backplane of the digital loop carrier. A controller with a modulator/demodulator applies voice and signaling data corresponding to multiple voice call sessions from the link to the digital interface. In the reverse direction, it also applies data corresponding to the multiple voice call sessions from the digital interface to the link.

According to still another embodiment, the invention is a method of connecting telecommunication call sessions from multiple stations at a subscriber premise, which is accomplished by generating signaling data at one of the stations and transmitting the signaling data over the multiple access link to the network interface. In response to receiving the signaling data at the network interface, the signaling data is transmitted over one of a digital loop carrier and a digital network depending on a called number in the signaling data. Then a channel is allocated in a multiple access link to a network interface to communicate data over the link, the user data corresponding to the signaling data and the channel deallocated in response to a termination of the user data.

In another embodiment, the invention provides a method of connecting telecommunication call sessions from multiple stations at a subscriber premise through a multiple access subscriber link. The following steps are performed: providing a digital interface to a backplane of a digital loop carrier, generating signaling data at a one of the stations; transmitting the signaling data over the multiple access link to the network interface; in response to receiving the signaling data at the network interface, applying the signaling data to the digital interface to create an appearance of a POT connected through a line card connected to the backplane.

In another embodiment, the invention provides a method of connecting telecommunication call sessions from multiple stations at a subscriber premise through a multiple access subscriber link. The method includes the following steps: providing a digital interface to a backplane of a digital loop carrier, generating signaling data at a one of the stations; transmitting the signaling data over the multiple access link to the network interface; generating DTMF tones and applying the tones to a telecommunications switch responsively to the signaling data and then subsequently connecting a call initiated at the one of the stations through a channel opened up in the step of applying the tones; generating further signaling data at another one of the stations transmitting the further signaling data over the multiple access link to the network interface; setting up a call session for transmission through a virtual channel of a digital network connected to the network interface (the step of setting up a call including transmitting a request on a signaling channel of the digital network for bandwidth required for a call corresponding to the signaling data); and applying subsequent voice data in a virtual channel responsively to a result of the step of transmitting a request.

According to still another embodiment, the invention provides a method of connecting telecommunication call sessions from multiple stations at a subscriber premise through a multiple access subscriber link. The following steps are included in the method. An indication of an initiation of a voice-dialing call at one of the stations is generated (for example, a phone is picked up for a period of time without dialing). This indication is transmitted through the link to network interface and, upon receipt of the indication at the network interface, a channel is opened in a digital network. Voice data corresponding to the called number are transmitted through the channel to a server of the network. The server determines the called number and sends it to the network interface. The network interface then connects a call based on the signaling data.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

In the drawing,

FIG. 4A1 is a block diagram of the embodiment of FIG. 4A modified by the addition of an internal cache system.

DETAILED DESCRIPTION OF PREFERRED EMBODIMENTS

Figure 1:
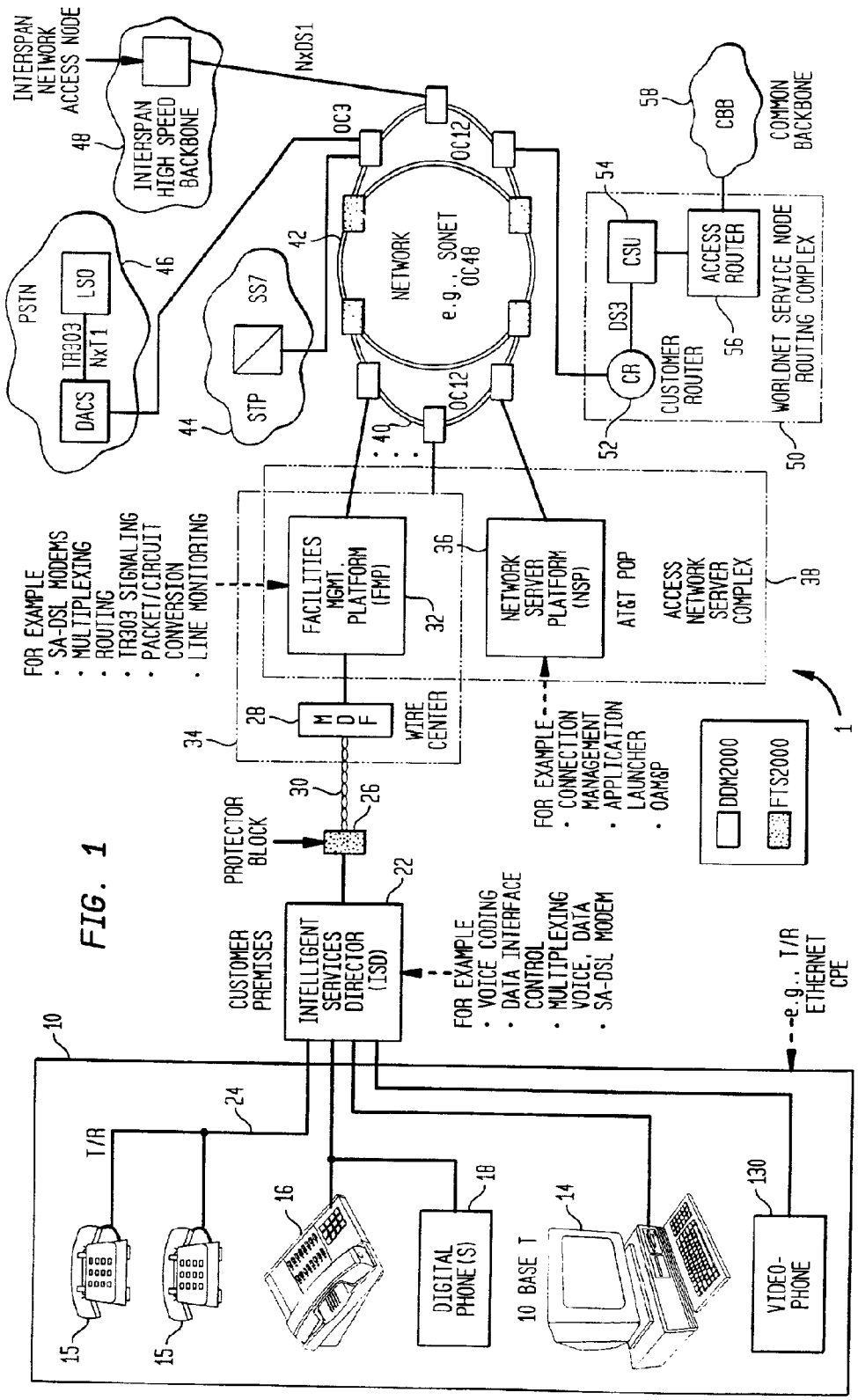
FIG. 1 illustrates an embodiment of a hybrid fiber twisted pair local loop architecture.

The following description provides an overview of how the primary subject of this application, the facilities management platform (FMP), fits into a communication network. Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the twisted-pair wire 30. The FMP 32 may be configured to support plain old telephone service (POTS) by handling voice signals digitized by the ISD 22 in various ways. Voice data can be multiplexed directly onto the digital backplane of a PSTN or modified digital loop carrier or it can be formatted for transmission directly on a digital (for example, interexchange) network which may be optical or ATM. Ultimately voice data may be received by a remote PSTN 46 and transmitted to a called party or through a remote FMP 32 to the called party. Demodulation of the subscriber link signal (e.g., DSL) is handled by a, for example, tethered virtual radio channel (TVRC) modem (shown in FIG. 4A). Non-voice data may be output to a high speed backbone network (e.g., a fiber-optic network) such as an asynchronous transfer mode (ATM switching network.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks. FMP 32 may also interconnect with other FMP 32 units to limit traffic on other network facilities for calls destined for nearby FMPs 32. Moreover, calls between two subscribers linked to the same FMP 32 may communicate through the FMP 32 without being linked to any of the other network facilities. In addition, the FMP 32 may provide internal caching to limit the burden on the external network facilities. For example, a movie might be cached during certain time of the day if one particular movie is being requested by many subscribers at around the same time.

Although the possibly massive demands of a cache for user data may make it economically unfeasible to cache data such as movies, the FMP 32 would, preferably, have an internal memory or other data storage that would contain information about each subscriber to which it is linked. For example, a subscriber may not subscribe to all the services the FMP 32 makes available. For example, one subscriber might want its calls, where possible, handled by the interexchange carrier by directly routing them through one of the digital networks (e.g., ATM) owned by the interexchange carrier or other owner of the FMP 32. Another subscriber may prefer to go through the local phone company through the modified DLC 70 for at least some calls depending on the pricing and features offered by the competing carriers. This data is preferably stored on such an internal storage at the FM 32. Such data could be updated by the NSP 46 as required. Storing such data, aside from saving bandwidth of external networks, will also speed the handling of calls.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence facility. The NSP 36 may further act as a gateway to, for example, any number of additional services. The major tasks of the NSP 46 is to handle connection management, act as an application launcher and provide operations administration maintenance & provisioning.

The ISD 22 may be interconnected to various devices such as a videophone 130, other digital phones 18, set-top devices, computers, and/or other devices comprising the customer premise equipment 10. The customer premise equipment 10 may individually or collectively serve as a local network computer at the customer site. Applets may be downloaded from the NSP 36 into some or all of the individual devices within the customer premise equipment 10. Where applets are provided by the NSP 36, the programming of the applets may be updated such that the applets are be continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure wide spread availability of the new features made possible by the present architecture, the customer premise equipment may be provided to end users either at a subsidized cost or given away for free, with the cost of the equipment being amortized over the services sold to the user through the equipment.

Figure 2:
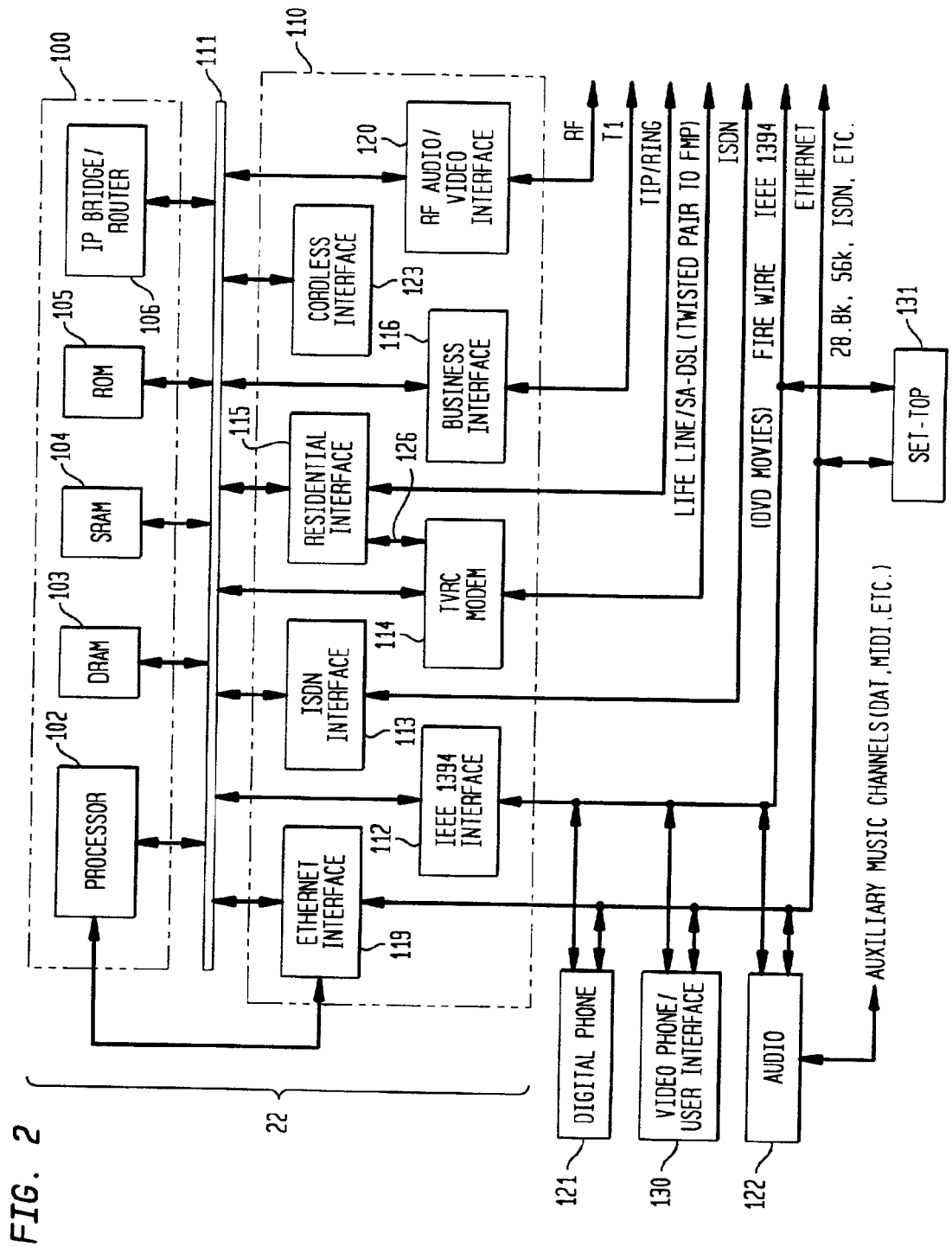
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices (not shown), facsimile devices 16, personal computers 14, and/or other digital or analog devices. Some or all of these devices may be connected with the ISD 22 via any suitable mechanism such as a single and/or multiple twisted-pair wires and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (e.g., for 28.8 kbs data, 56 kbs data, or ISDN), an IEEE 1394 "fire wire" interface 112 (e.g., for digital a videodisc device (DVD)), a TVRC modem interface 114 (e.g., for a digital subscriber line (DSL) modem), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD 22 may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital radio cable channels by simply having the user push a cable channel button on the telephone and have the speaker phone output particular channels. The telephone may be preprogramed to provide the radio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a settop 131.

In further embodiments, the ISD 22 may be configured as an IP proxy server such that each of the devices connected to the server utilize transmission control protocol/internet protocol (TCP/IP) protocol. This configuration allows any device associated with the ISD 22 to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

The FMP 32 may also be configured to function as an IP proxy server. The protocal between the FMP 23 and ISD22 is not restricted in this case as it would be if the ISD functioned as the IP proxy server. In either case, whether the ISD 22 or the FMP 32 functions as the IP proxy server, the possibility of permitting telephone calls from any phone linked through the ISD22 for internet telephony becomes possible. A caller dials a number from, preferably from a telephone that provides menu and function buttons from the telephone, such as the videophone described in the related applications incorporated by reference. The user would indicate to the ISD whether a call was to be handled through a narrowband network (such as typically provides dedicated 64 Khz bandwidth through switches) or a broadband network such as a packet-switched network (e.g., ATM, SONET, an internet backbone, etc). Since the broadband service is likely to be less costly, although the service may not be as good, the user is able to trade a lower quality but cheaper service for a high quality service that costs more. This decision can be made automatically through the NSP (see discussion of NSP functionality in this specification and related applications incorporated by reference). A caller dials a number. The signaling data (containing the number) is sent to the NSP which looks up the number in a table of user preferences and determines the called number is to be handled through a broadband network. The NSP 46 sends a message back to either the FMP 32 or the ISD 22, whichever is set up as the proxy server, and the FMP 32 or ISD22 responds by routing the call appropriately (and, of course, packaging the voice data as appropriate to the type of network).

Although the features discussed above are contemplated in terms of the internet context and IP protocol, they apply to any kind of broadband network. Thus, the FMP 32 or ISD 22 can package voice data appropriately for any broadband network selectively according to user preferene as outlined above.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users'preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
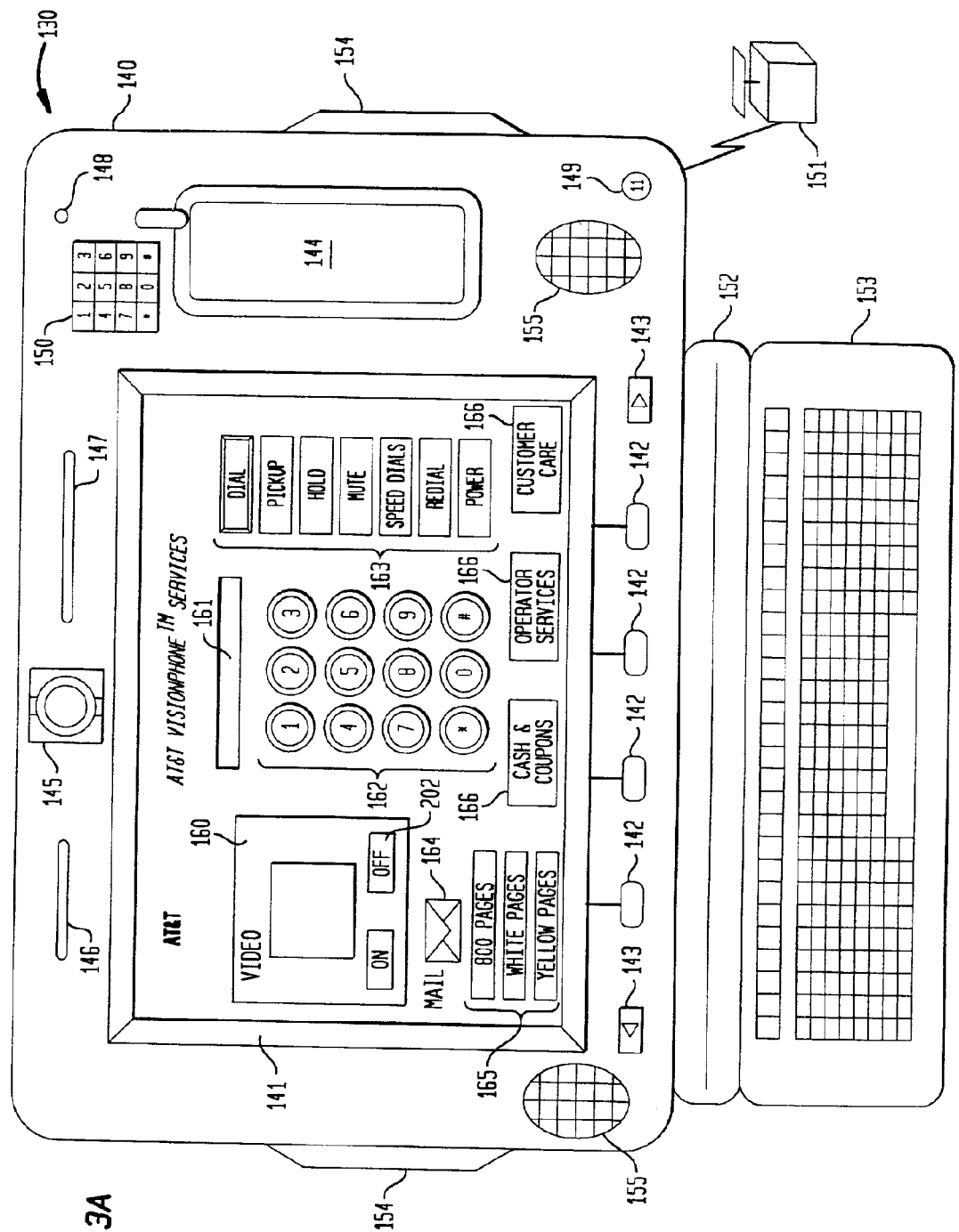
FIGS. 3A and 3B illustrate an embodiment of a video phone consistent with the architecture shown in FIG. 1.
Figure 3B:
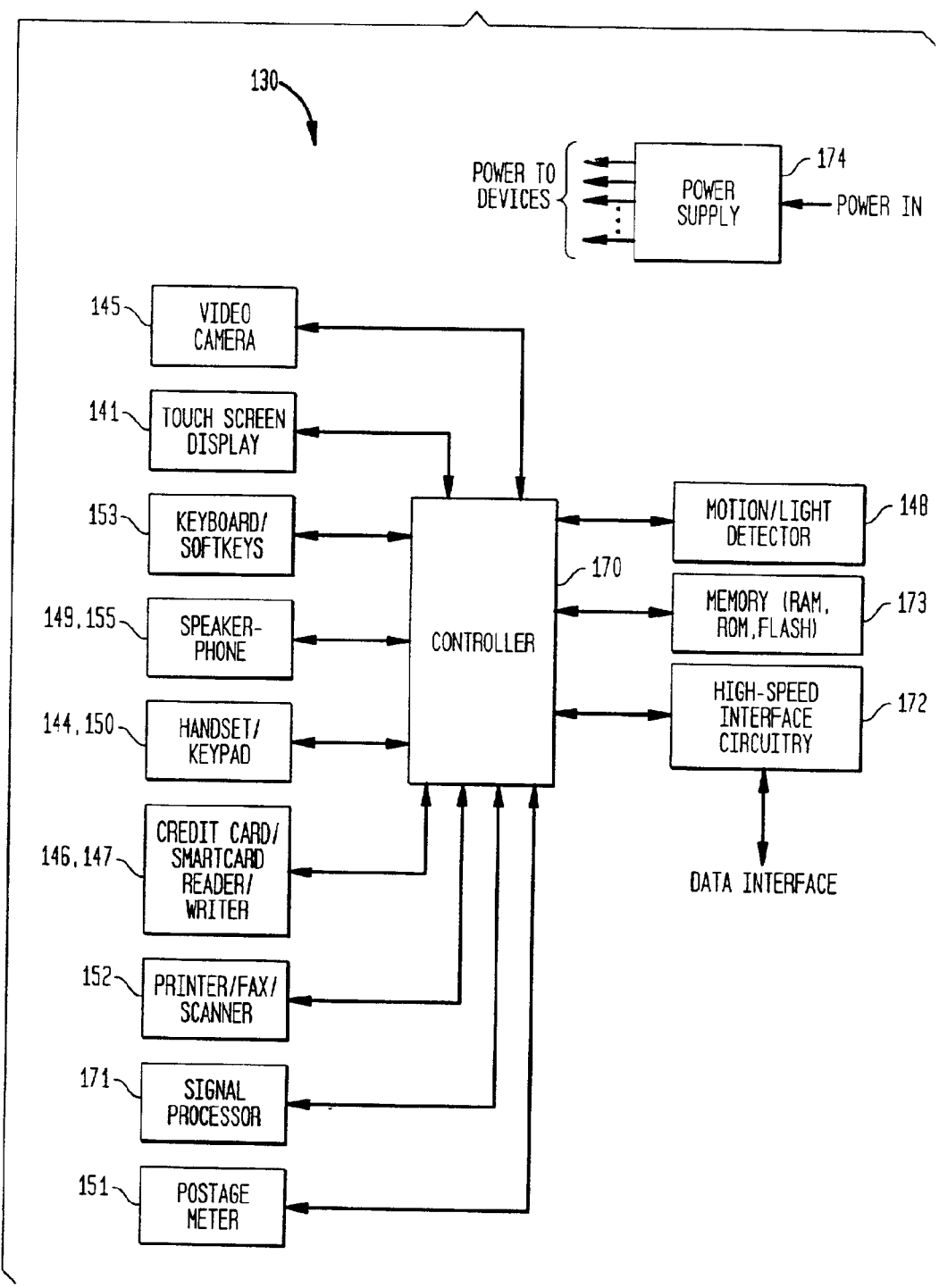

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
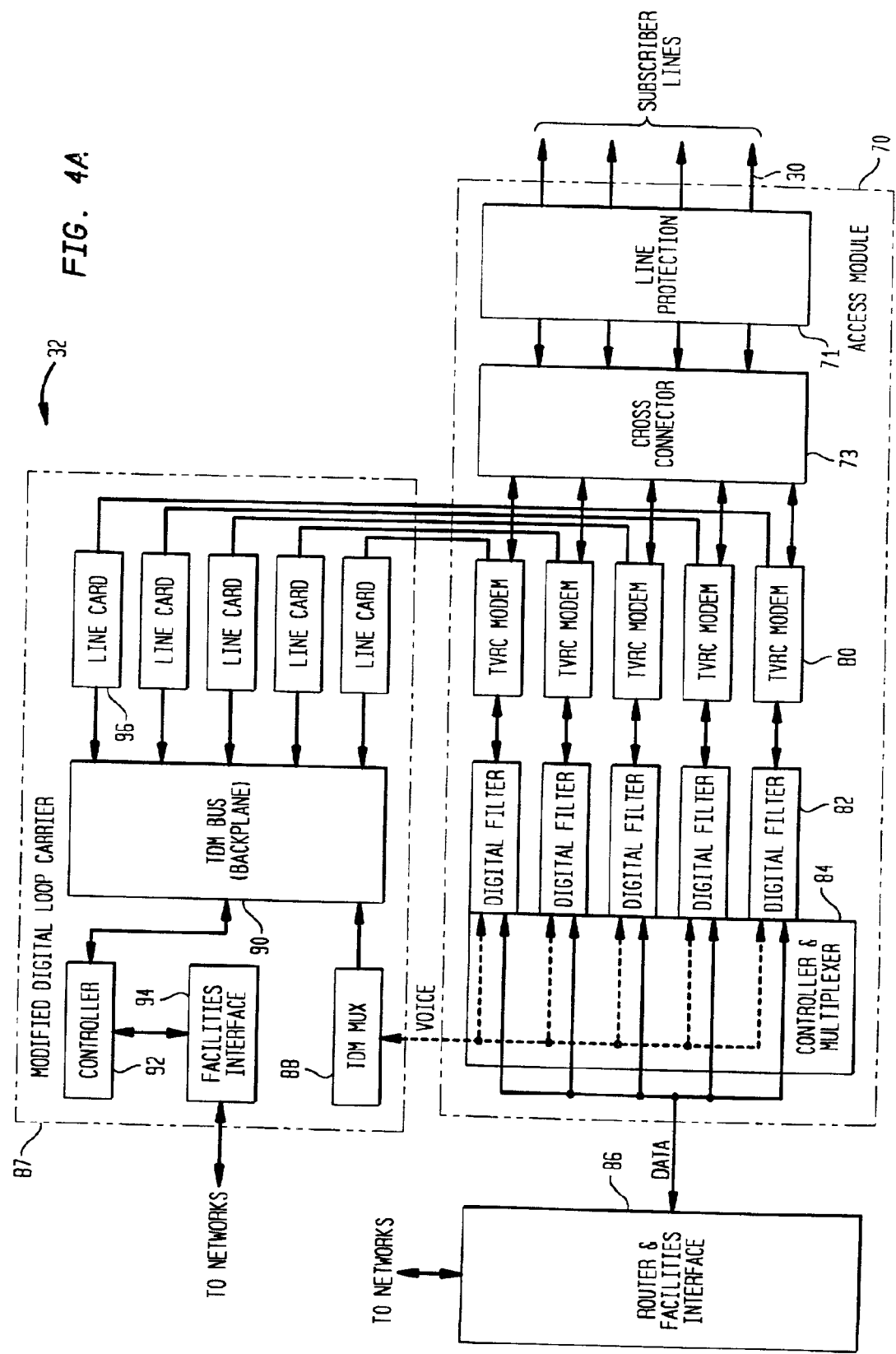
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments for transport across the digital subscriber loop. The FMP 32 may also terminate all link layers associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexer (MUX) 88, a TDM bus 90, a controller 92, and/or a facilities interface 94.

During normal operations, digital signals on the subscriber lines 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexer 84 and the digital filters 82. The digital filters 82 may separate the voice signals from the digital data signals, and the controller multiplexer 84 may then multiplex the voice signals and/or data signals received from the digital filters 82. The controller multiplexer 84 may then send multiplexed voice signals to the TDM MUX 88 and the data signals to the router and facilities interface 86 for transmission to one or more external networks. The TDM MUX 88 may multiplex the voice signals from the controller multiplexer 84 and/or send the voice signals to the TDM bus 90, which may then send the digital voice signals to the controller 92 and then to the facilities interface 94 for transmission to one or more external networks. Alternatively, voice data may be repackaged by controller & multiplexer 84 for application directly to any of various digital networks without going through modified DLC 70. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexer 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
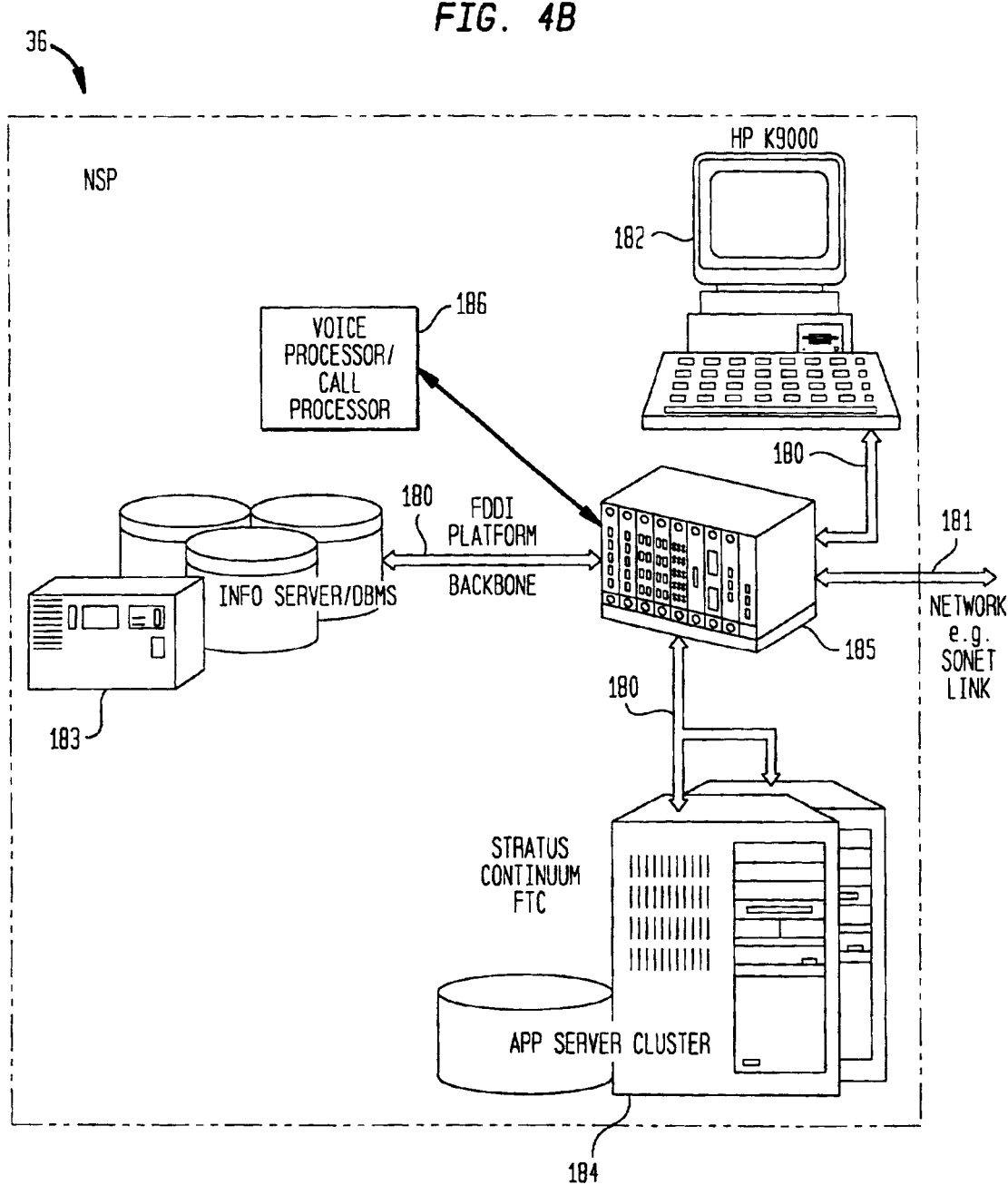
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 maybe connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor. 186 configured to handle call and data routing functions, set-up functions, distributed operating system functions, voice recognition functions for spoken commands input from any of the ISD connected devices as well as other functions.

Referring again to FIGS. 1 and 4A, as mentioned, the FMP 32 serves a link-layer termination for the high-speed subscriber data link, for example, a DSL link between the ISD 22 at a customer premise and the digital network of an interexchange carrier (shown in FIG. 1). The FMP 32 communicates with the ISD 22, receiving signaling data, user data, and voice data over (preferably) a high speed DSL link. The signaling data tells the FMP 32 how to handle (route) the voice and user data. There are two major routing alternatives, to route as a normal call through the modified DLC 70 or to route directly through the interexchange carrier network by converting the user and voice data directly from the format of the subscriber link to the format of the interexchange carrier network used. In the latter case, a dialogue between the FMP 32 and the NSP 46 may be established to inform the NSP 46 that a call is impending or terminated and to request that it allocate or deallocate bandwidth of the network accordingly. The following is a detailed description of the elements of a preferred embodiment of the FMP 32.

FMP 32 receives digital data over a twisted pair connection (preferred, but could be any other medium) which terminates at a line protection block 71. In an embodiment, the FMP 32 supports DSL communication with the ISD 22. The termination to which twisted pair wiring connects the ISD 22 with the FMP 32 is responsible for terminating the DSL link. This includes providing Borscht as well as DSL modem functions.

During normal operation the DSL Facilities Termination subsystem is responsible for providing over-voltage protection. This is the same as in a convention wire termination. In addition, the FMP 32 includes DSL modems or TVRC modems 80 to convert analog symbols to digital data and vice versa using for example M-PSK or M-QAM modulation/demodulation. These techniques are described in the literature and applications incorporated by reference in the present application.

Another function of the FMP 32 is to provide in-service testing/monitoring of the ISD facility. This aspect stems from the fact that the FMP 32 stands in the shoes of the DLC it supplements.

On the network side of the modems, data must be framed before being modulated to be transmit over the DSL link. Other preparations include encoding for forward error correction (for data not suited to retransmission such as voice data) and interleaving (to reduce drastic effects of impulsive noise or fading).

The final output of the- termination/modem subsystem is a stream of DSL frames containing higher-layer protocol data. In the CPR-to-network direction. The controller & multiplexer 84 processes the DSL frames it receives from the Facilities Termination subsystem to terminate any link layers associated with the DSL segment of the connection, (in an embodiment) re-construct (e.g. IPv6) packets from the DSL frames, and separate (IP) packets containing voice, data, and signaling (call-routing or data routing) information.

In an embodiment of the invention, for purposes of transmitting voice data directly from an external digital network (as opposed to through modified DLC 70) data containing voice (for example, in voice-packets) are delivered by the controller & multiplexer 84 to a packet-to-circuit translation subsystem (not shown separately) by an internal network system (also not shown separately). User data packets are delivered to/from the external networks (which can be interexchange carrier networks or any other external network) and signaling packets to/from the subscriber signaling subsystem of the external network where user data or voice data are routed directly as packets or to/from controller 92 where user or voice data are routed through modified DLC 70.

In the network-to-CPE direction, the controller & multiplexer 84 processes the packets it receives from all subscriber signaling and external routing subsystems. This involves multiplexing (at the packet level) voice, data and subscriber signaling packets bound for a single DSL link. It also involves mapping packets onto DSL frames, and terminating the FMP-side of any link layers associated with the DSL link. Packets traveling in the network-to-CPE direction are sent directly to the DSL termination for delivery to ISD 22.

For purposes of transferring data between its subsystems, such as within the controller & multiplexer 84, voice, data, and signaling packets are transported via an internal routing system (not shown separately) that is at least logically, and perhaps physically also, distinct from the external networks with which the FMP 32 communicates. This is useful for reliability, security, and availability reasons.

In FIG. 4A, various elements of the FMP 32, which could be on a single plug-in card that accommodates terminations for four subscribers lines, are shown. Each of the four subscribers can be connected to a respective (any) one of five TVRC modems 80 (TVRC or DSL preferred, but could be any type of digital modem) via a cross-connector switch. In the event of a failure of one of modems the ISD 22 indicated by, for example, irregular communications detected in controller & multiplexer 84 or controller 92, cross connector 73 will switch the subscriber from the suspected bad TVRC modem to a spare one of the five TVRC modems 80. The FMP 32 could employ failure indicators (not shown) to advise maintenance personnel that a modem has been switched out and that it should be replaced. TVRC modems 80 are high speed digital modems with the ability to transmit and receive data at rates of 1 Mbit or more using advanced modulation, error-correction coding, and data compression techniques. These are preferred known technologies and are described in other references including some of the copending applications incorporated by reference in the present application. No particular technology or technique is identified with modems 80 and more advanced technologies may be employed with the present invention.

The five modem connections to the cross connector 73 are switchable to respective connections to five line cards to provide telephone service (life line service) in the event that the ISD 22 becomes inoperative. In a conventional digital loop carrier (as opposed to modified DLC 87) the line cards connect over twisted pairs to POTs to interface the digital backplane 90 and the analog POTs. In the modified DLC 87, they serve the same purpose when the line card is switched-in and the TVRC modem switched-out due to failure of a connected ISD 22. That is, the line cards serve as the terminations of the analog phone lines providing power to the telephones via a battery, supplying the ringing voltage power, out of service testing and supervision of the subscriber terminal as well as interfacing the digital communications on the TDM backplane 90 to the analog system of the calling/called POT. Thus, in the event of failure of an ISD 22, the FMP, for that particular line, acts like a conventional DLC because the entire access module 70 and its features and the modified aspects of the DLC 87 are bypassed. In the event of a failure at the customer premises, battery supply to the subscriber line, out-of-service testing, ringing voltage supply, and supervision of subscriber terminals are also provided.

Under normal operation, the TVRC modems 80 demodulate some kind of tone-symbol (e.g., QAM PSK, etc.) on the subscriber lines to generate subscriber data including voice, signaling, and user data, and apply the resulting data stream to the digital filters 82. As discussed above, the digital data from the ISDs 22 contain voice, digital information, and signaling from, potentially, many different subscriber equipment all multiplexed into the same data stream, preferably a packet-based protocol as discussed above. At a time when a call is just being dialed by the user, the data stream will contain signaling information (unless a voice-activated dialing feature is being used as discussed further below). At other times, signaling data may be generated automatically by subscriber equipment such as a settop unit in the process of ordering a movie.

Call setup may be performed in a way that bypasses the normal interaction between the regular DLC (not shown) and the modified DLC 87 because the ISD 22 may send call signaling data as digital information to the FMP 32. Thus, there may be no need to interpret DTMF tones or dialing pulse. The FMP 32 may interact through the controller 92 set up the call conventionally through the modified DLC 70 by way of the TDM multiplexer 88. Or the signaling data from the subscriber link may be transmitted in the form of DTMF tones which are interpreted either through a DLC facility or by a detector in FMP 32. The direct mechanism for handling signaling data is preferred because DTMF tones would take up bandwidth unnecessarily.

Alternatively, calls can be routed directly to the digital network as packet data, for example. In such a process, where calls are placed digitally through the packet network, signaling information may be sent to the NSP 46 along with control information informing the NSP 46 that a virtual circuit for a call is requested. If it is a voice call, a high priority must be given to the virtual circuit and the NSP 46 must make sure the bandwidth is available. At the time a call is made which is to be routed directly from the FMP 32 through the packet-switched networks (e.g., SONET or ATM), the FMP 32 may be handling data to and from the subscribers. At the time the request for a high priority voice channel is made, the ISD 22 has already de-allocated bandwidth assigned for data transmission to make room for the higher priority voice transmission. The FMP 32 communicates the demand for high priority bandwidth to the NSP 46 and the NSP 36 may deallocate bandwidth formerly dedicated to data transmission (the same data for which bandwidth was de-allocated by the ISD 22) as it, at the same time, allocates bandwidth for the high priority call. This may involve a transmission from the FMP 32 to the NSP 46 telling the NSP 46 that less low-priority data bandwidth is needed in the current call and high priority bandwidth is needed for the new voice call. The NSP 46 then responds by allocating or identifying available circuits (virtual) and providing the appropriate signaling. When the voice call is finished, similar dialogue between the FMP 32 and NSP 46 takes place. The termination of the call is detected by the FMP 32 and a message sent to the NSP 46 informing it that additional bandwidth is needed for data communications and no (or less) bandwidth for the voice call.

In the preferred embodiment, the voice and digital information is time domain multiplexed (TDM) in the digital data stream applied to the digital filters 82. This embodiment makes it simple and efficient to provide high priority to voice communications by the ISD 22 by providing a bandwidth on demand as discussed elsewhere in this application and in related applications incorporated by reference in this application. In the TDM system of the preferred embodiment, it is also convenient to filter out digitally voice data from the demodulated data streams and apply this data directly to the TDM backplane 90. The latter requires some discussion regarding routing.

The TDM multiplexer 88 takes the place of multiple line cards. As mentioned, it is the job of the line cards 96 in a conventional DLC to convert voice data to digital data and apply it to the TDM backplane 90. In so doing, it will also be the job of the control 92 and the facilities interface 94 to handle circuit (TDM) to/from packet conversion. In conventional DLCs voice data also includes DTMF tones which are decoded in the line cards 96 and used by the controller 92 for call setup. The same job is performed by the TDM multiplexer 88. Instead of DTMF tones, the routing data (called number, call origination data, signaling, etc.) are applied in digital form directly to the TDM backplane 90 for handling by the controller 92. Thus, TDM multiplexer 88 creates the appearance of being a line card (or set of line cards) to the controller and other facilities from the TDM backplane 90 and out through the interexchange network.

The TDM multiplexer can be plugged as a single card directly into the TDM backplane 90. To the core network (the conventional switched network such as connected through the DLC), all equipment including the NSP 46, the FMP 32 appears to be a conventional DLC. This is advantageous, since there is minimal impact to the remainder of the network when the equipment is integrated into the network. This configuration provides a seamless interface between the fully digital telephone linked through the ISD 22 and the modified DLC 87. It also provides a system that allows packet switched voice and data to work side by side and together with traditional digital loop carrier equipment.

In the preferred embodiment, in the CO to CPE direction, the FMP 32 performs the following functions. First, the FMP 32 breaks up the control messages and packets containing user data into segments that fit into the DSL frames. Secondly, the FMP 32 multiplexes these frames together with frames containing speech so that the can be transported to the ISD 22 over the DSL link. Third, the FMP 32 terminates all link layers associated with the DSL segment of the connection. The reverse happens in the CPE to CO direction. FIG. 5 shows how the access module takes information from the DSL modems 201 and places the voice V1, V2, etc. and data D1, D2, etc. into frames 203, then multiplexes the frames 203. Consider a scenario where data is fed to the TVRC modems 201 and a voice call comes in. Assume that 1 Mbps is available for information transfer via the TVRC modems 201. Prior to the incoming call, all 1 Mbps is used up. However, as soon as a voice call comes in, since voice has a higher priority that data, a 64 Kbps channel (slot) is deallocated from data usage and is allocated for voice. If a second voice call comes in, then another data channel will be deallocated from data usage and allocated for voice. As the voice call gets terminated, then the allocated voice slots will be reallocated to use by data. Hence, the system dynamically allocates bandwidth in real time to maximize information transfer. Note that this time domain multiplexing could be performed with frequency domain multiplexing, as with a multitone channel, as well.

Within the local access side of the local loop, multiple FMPs 32 may be grouped and served by a single NSP 46. Each FMP 32 is in turn interconnected to a plurality of ISDs which serves the subscribers in a given local loop. Usually, the NSP 46 will be located in an AT&T Point-of-Presence (POP). However, this might not be possible in all areas and it could possibly be co-located with other equipment, depending on space availability.

Although, as discussed above, the TDM multiplexer 90 allows a seamless interface between the "old technology" DLC and "new technology" employing the access module 70 and the modified DLC 87 and other elements of the architecture described here and in related applications, substantial modifications to software of the controller 92 will provide additional features. These features are discussed here, elsewhere in this application, and in the related application incorporated by reference in this application. For example, when multiple calls to the same called party are made, the modified DLC 87 must handle such calls differently. In a conventional setup, a message would be sent by the DLC 87 that the called party is off-hook. In the current system of the invention, the called party may still receive additional calls to the same party. Another example of how software modifications for handling of voice calls is provided by the voice-activated call example that follows, after a discussion of the interaction between the NSP 36 and the FMP 32. Note that the details of such software modifications are not necessary to discuss in detail as such are quite straightforward to implement.

To illustrate the interaction between the various components of the instant invention, a voice dialing scenario will be described. When a subscriber picks up the telephone and if no digits have been dialed after a specified period of time has elapsed, the ISD 22 may start digitizing the voice information into data, for example, 64 Kbps -law PCM data. The voice samples are then stored in a wave file, which is subsequently transmitted to the FMP 32. On receipt by the FMP 32, the FMP 32 will forward the information to the NSP 36. The NSP 36 will attempt to authenticate the request by ensuring that the subscriber does indeed have a subscription to the voice dialing service. The NSP 36 can determine the identity of the subscriber by looking at the address in a certain field of the packet. The NSP 36 can therefore interpret the information in the wave files and take the appropriate action. Let us assume that subscriber John wanted to call another subscriber Paul. The NSP 36 will also attempt to determine who is Paul as defined by John. Once the telephone number for John has been determined, the NSP 36 will inform the FMP 32 to set up a call to John's number. The FMP 32 will then go through the facilities interface 94 to set up the call. In an embodiment, this would be over TR303 interface and the signal would be sent to a DLC to request the local Serving Office to indicate the appropriate ports to use for setting up the call. The FMP 32 has its own DTMF and tone generator which is used for signaling when the interexchange carrier network is to be bypassed in routing a call. For example, the FMP 32 may be connected to a switched network that requires the generation of DTMF signals to set up a call. Such a call can be handled through the FMP 32.

Note that there is a significant advantage implicit in the preferred design. The voice dialing service may be provided by a different company from the one that actually connects the call. There is no need to pay for the Local Exchange Carrier (LEC) for providing such a service and it can all be done with a single facility. Similar services, such as speed dialing, that the LEC provides can now be made available locally.

In the case where there is an incoming call, say from the PSTN, the FMP will get the information from the DLC. The information will be dispatched over the signaling channel to the NSP 36. The NSP 36 will instruct the FMP 32 with the information on how the call should be terminated. On receiving this message, the FMP 32 will send the appropriate signaling message to the ISD 22. The ISD 22 "knows" which phones are in use and which ones are not. As a result, it will apply ring to a phone that is free.

In the CPE to CO direction, data "left over" after filtering of voice data is accomplished by the digital filters 84 is transmitted by the access module to the interexchange network. This data includes routing data as well as content. The link layer interface is provided by the controller and multiplexer 84 of the access module 70. Thus, for example, if the exported data is to be transmitted over an external ISDN interface, the data from digital filters 82 would be formatted and timed to be applied to such an interface by the controller and multiplexer 84 of the access module 70.

In the disclosure of the instant invention, Tethered Virtual Radio Channel (TVRC) is the preferred modulation technique. However, the instant invention is not limited to the use of TVRC modulation technology. However, TVRC would prove to be a major advantage over other proposed schemes, since it provides an alternate to interleaving which is used to overcome impairments such as noise and interference and which results in unacceptable delays.

Referring to FIG. 4A1, in an embodiment, the FMP 32A, contains a cache 85. As described in elsewhere in this application and in related application incorporated in this one by reference, the hybrid fiber twisted pair local loop architecture permits such services as broadcasts to be conveyed through the interexchange carrier network. For example, movies, radio shows, software and other data services, can be transmitted into the homes and offices of subscribers. To lighten the burden on the interexchange carrier network, frequently requested broadcasts or data products or services can be cached in the FMP 32A. Thus, many requests through a single FMP 32A can be handled without going outside the FMP 32A to route the data.

Although in the embodiments described, the interface between the FMP 32 and the ISD 22 employs TDM, other formats for folding the heterogeneous mix of data may be employed. Existing protocols as well as protocols to be developed may fall within the scope of the present invention and the claims are not intended to be limited to such a specific communication format. In addition, different formats and protocols may be used on the same link. For example, a portion of the bandwidth of the twisted pair may be modulated as a multitone signal and a portion modulated as a single band (e.g., ISDN signal below 40 kHz and discrete multitone, DMT, between 100 kHz and 1 MHz). Alternatively, the lower 40 KHz of the band may be utilized for POTS while the remainder of the bandwidth may be utilized for data and/or multiple phone lines.

In addition, although voice communications in an embodiment of the FMP 32 are handled conventionally, the FMD 32 provides the capability to use the digital network directly to transmit voice calls. In such a case, instead of a call being routed conventionally through the modified DLC 32, the FMP 32 would notify the NSP 36 that a particular call is a voice call and the NSP can control the ATM or SONET network to allocate bandwidth to setup the virtual circuit required to support the call.

In addition to monitoring the link between the ISD 22 and the FMP 32 for purposes of identifying a failure of the ISD 22 (which requires life-line support), the FMP 32 may provide other line monitoring functions, such as off-hook detection, through interaction with the intelligent ISD 22. For example, a subscriber, although the bandwidth is available to send an additional call to the same called number, may not wish to have additional calls ring through. The FMP 32 in such a case could respond to an additional call with a busy signal or voice mail.

Voice information may be transported across a fiber network such as a SONET backbone to a remote switch such as PSTN 46 switch for processing at a remote site. The remote switch may be located in only one of a central office of a plurality of central offices, whereas the FMP 32 is preferably located in every central office. This allows the cost of the switch to be minimized, allowing the use of one switch for a plurality of central offices. Thus, the architecture is adaptable for the case where there is a small percentage of the users in a particular area.

In some embodiments, the FMP 32 may be configured to appear to the network as a conventional DLC. As an alternative configuration, the FMP 32 may be configured directly to connect to the ATM without transport across the SONET network. It may be desirable to transmit the voice data from the FMP 32 to the PSTN 42 over a high speed packet network (e.g. ATM, which is superimposed on top of the SONET network. This has an advantage in that the packet transmission of voice information can be more efficient than more conventional treatment (for example, it is susceptible to a high degree of compression). However, it requires additional management to manage delays, buffer overruns, drop packets, etc., across the ATM network as mentioned above.

As mentioned above, the FMP 32 may connect with a variety of digital networks. Among these may be trunk lines to interconnect nearby FMPs 32. This would allow the FNP 32 to limit traffic on other network facilities for calls destined for nearby FMPs 32. Calls between two subscribers linked to the same FMP 32 may communicate through the FMP 32 internal network without being linked to any outside network facilities.

The FMP 32 may also programmed to support functions performed by the NSP 46 and ISD 22 as discussed above and in related applications incorporated herein by reference. For example, software updates for the ISD 22 may be transmitted by the NSP 46 to the ISD 22. In such cases, the FMP 32 acts as a conduit merely formatting information packets between the NSP 46 and the ISD 22 if necessary. The FMP 32 may also act as a mere conduit when serving as an internet connection. If data transmitted over the subscriber line is already in IP form, the FMP 32 may not need to repackage the data exchanged between the internet and ISD 22. For example, the ISD 22/CPE 10 network may be configured as an intranet. In that case, the FMP 32 may only need to act, for purposes of communicating with the internet, like a dumb data pipeline. However, it may simultaneously perform its other tasks such as connecting voice calls, and other kinds of data sessions as discussed above.

Note that, depending on the configuration of the interexchange and other networks with which the FMP 32 communicates, signaling and communications with the NSP 46 may occur over a different physical and/or logical network from that handling the voice and user data. In the above discussion, the distinction is not made since it is practical and routine aspect of network design that varies from one network to another. Thus, for example, communication between FMP 32 and NSP 46 to notify NSP 46 of a request for bandwidth to be used for a call may occur over one network, a signaling network, while data transmission may occur over a different network used for user and voice data.

Various means can be used to share information about the nature of the data being transmitted and received at each end of the subscriber link. Many applicable mechanisms may be employed and it sufficient to say that the various layers of the subscriber link interact so that both the IDS 22 and the FMP 32 keep each other informed about the nature of the data being transmitted on the subscriber link.

In response to a telephone call originated from a phone connected to the ISD 22, the ISD 22 digitizes the telephone DTMF tones, if necessary (since some special phones might not require DTMF decoding). The ISD 22 may generated dial tone, if necessary, and translates the signaling information as necessary and multiplexes the signaling data, applying it to the subscriber link. High priority bandwidth of the subscriber link is allocated as discussed above by both the ISD 22 and the FMP 32 acting concertedly. Bandwidth-on-demand feature is described elsewhere in this application and in related applications incorporated by reference. Modem 80 demultiplexes signal data and FMP 32 controller multiplexer 92 extracts signaling data and determines how to handle the call by either applying the signaling directly to the DLC 70 backplane 90 via TDM multiplexer 88 or to an external network through controller multiplexer 92 (which could be a separate signaling network). The call also might be directed through the internal network of the FMP 32 to be connected to a subscriber connected to the same FMP 32 facility. The determination of where to direct the signaling data is made according to the signaling data itself. It may depend on whether the subscriber subscribes to a service of a certain carrier whether the call is handled by modified DLC 70 as if it were a PSTN. It may depend on whether the call is local or long-distance. If the call is to be handled on the external network controlled by the NSP 46, the controller multiplexer 92 may respond to the signaling information by transmitting a request for bandwidth to the NSP 46 and wait for a virtual circuit to be set up. Once the connection is available, the caller would be signaled by transmitting a ringing sound and subsequently full duplex voice communication over the network. In this case, the FMP 32 simply receives voice data from the network and converts it to a format appropriate to the subscriber link and feeds data from the subscriber link to the network, reformatting as necessary appropriate. When one of the parties hangs up, the FMP 32 may, as mentioned above, indicate this to the NSP 46 so that deallocation and reallocation of network bandwidth. That is, once the call is terminated, a session involving lower priority user data (e.g., internet connection to a PC of the subscriber) might be allocated more bandwidth in the external network because of the increased data flow allocated in the subscriber line after the termination of the high priority phone call. Where the phone call is patched directly to the TDM backplane 90, the signaling can be applied as would be generated on the backplane 90 by a line card 96. All the network interfacing is done conventionally in this instance. The FMP 32 role is to simply drive the DTM multiplexer 88 as if it were a telephone connected through a line card 96.

Consider now a telephone call generated by a remote party to a party connected through the FMP 32 and ISD 22. In this case, because of the features of the architecture discussed in this application and related applications, the telephone call could be an additional call to a telephone number that is already in use. Signaling data would be received by the controller multiplexer 92 through either the TDM multiplexer 88 if the call were received through the conventional digital network connected to the modified DLC 70, or from an external network, which might be a separate signaling portion of the network. A call generated through the modified DLC 70 would be signaled through the TDM multiplexer 88 to the controller and multiplexer 92. Controller and multiplexer 92 would then act on the call to simulate a regular telephone call with the following exceptions: Appropriate signaling data would be multiplexed and modulated on the subscriber link. The ISD 22 would receive the signaling data and send a ring to one or more available phones or answering machines. Upon detection of off-hook, a message sent to the FMP 32 would be acknowledged and the ISD 22 and FMP 32 would create a virtual circuit in the subscriber link to handle the voice traffic. Upon on-hook detection, a response consistent with the rest of this description would be generated in the FNP 32 and ISD 22. A call through any of the external networks would be handled in the same way in that signaling would cause the ISD 22 to generate a ring, then a virtual circuit would be established for the duration of the call. Again, a dialogue between the FMP 32 and the NSP 46 may be required to maximize the efficiency of the use of external network resources. In addition to the possibility of connecting through another digital network via the DLC, the FMP 32, equipped with a sound generator could convert the voice data on the subscriber link for transmission over a pure analog local exchange carrier or other pure analog network.

The FMP 32 continuously monitors the status of the subscriber link no matter how much traffic there is on it any time. This can be done in many ways, such as by sending and receiving test data or dummy information or causing subscriber equipment to send status and test results to the FMP 32. In the event of a failure at the ISD-end of the subscriber link, the life-line support function of the FMP 32 is invoked. The controller and multiplexer 92, upon detection of a failure of a type that would prevent a subscriber from communicating over his/her telephone, throws a switch at the subscriber end of the modem 80 to tie the subscriber medium directly to a line card. This switch could be invoked by a power failure at either end of the subscriber link and could be handled external to the controller and multiplexer 92 by a durable and safe mechanism. The ISD 22 has internal hardware and software to insure that at least one POT is directly tied to the subscriber link medium in the event of such a failure. In this way, life-line support provides POT service through the modified DLC 70 that is essentially the same as normal service through a conventional DLC. Ringing voltage and power are supplied through a batter to the phone as in normal telephone service.

Note that the band-width on demand feature described in the present application and in the related applications incorporated by reference may be implemented in a variety of different ways. Foe example, where the subscriber link is implemented through discrete multitone modem technology, each voice channel could be allocated one or more tones of 4 kHz or as required or available depending on the implementation. When a voice virtual circuit is required, a toneband is deallocated from other lower priority service and applied to transmit the voice data. This is basically using frequency division multiplexing as opposed to time division multiplexing to separate the various voice data in independent streams to insure 100% priority (by 100% priority, it is meant that if a voice channel is established, the resources are governed so that it remains 100% open for the duration of the requirement).

The following applications, filed concurrently herewith, are hereby incorporated by reference:

1. A Hybrid Fiber Twisted-pair Local Loop Network Service Architecture (Gerszberg 41-3-13);
2. Dynamic Bandwidth Allocation for use in the Hybrid Fiber Twisted-pair Local Loop Network Service Architecture (Gerszberg 42-4-14);
3. The VideoPhone (Gerszberg 43-9-2);
4. VideoPhone Privacy Activator (Gerszberg 44-10-3);
5. VideoPhone Form Factor (Gerszberg 45-11-4);
6. VideoPhone Centrally Controlled User Interface With User Selectable Options (Gerszberg 46-12-5);
7. VideoPhone User Interface Having Multiple Menu Hierarchies (Gerszberg 47-13-6);
8. VideoPhone Blocker (Gerszberg 79-38-26);
9. VideoPhone Inter-com For Extension Phones (Gerszberg 48-14-7);
10. Advertising Screen Saver (53-17);
11. VideoPhone FlexiView Advertising (Gerszberg 49-15-8);
12. VideoPhone Multimedia Announcement Answering Machine (Gerszberg 73-32-20);
13. VideoPhone Multimedia Announcement Message Toolkit (Gerszberg 74-33-21);
14. VideoPhone Multimedia Video Message Reception (Gerszberg 75-34-22);
15. VideoPhone Multimedia Interactive Corporate Menu Answering Machine Announcement (Gerszberg 76-35-23);
16. VideoPhone Multimedia Interactive On-Hold Information Menus (Gerszberg 77-36-24);
17. VideoPhone Advertisement When Calling Video Non-enabled VideoPhone Users (Gerszberg 78-37-25);
18. Motion Detection Advertising (Gerszberg 54-18-10);
19. Interactive Commercials (Gerszberg 55-19);
20. VideoPhone Electronic Catalogue Service (Gerszberg 50-16-9);
21. A Facilities Management Platform For Hybrid Fiber Twisted-pair Local Loop Network, Service Architecture (Barzegar 18-56-17);
22. Multiple Service Access on Single Twisted-pair (Barzegar (16-51-15);
23. Life Line Support for Multiple Service Access on Single Twisted-pair (Barzegar 17-52-16);
24. A Network Server Platform (NSP) For a Hybrid Fiber Twisted-pair (HFTP) Local Loop Network Service Architecture (Gerszberg 57-4-2-24);
25. A Communication Server Apparatus For Interactive Commercial Service (Gerszberg 58-20-11);
26. NSP Multicast, PPV Server (Gerszberg 59-21-12);
27. NSP Internet, JAVA Server and VideoPhone Application Server (Gerszberg 60-5-3-22-18);
28. NSP WAN Interconnectivity Services for Corporate Telecommuters (Gerszberg 71-9-74-21-6);
29. NSP Telephone Directory White-Yellow Page Services (Gerszberg 61-6-4-23-19);
30. NSP Integrated Billing System For NSP services and Telephone services (Gerszberg 62-7-5-24-20);
31. Network Server Platform/Facility Management Platform Caching Server (Gerszberg 63-8-6-3-5);
32. An Integrated Services Director (ISD) For HFTP Local Loop Network Service Architecture (Gerszberg 72-36-22-12);
33. ISD and VideoPhone Customer Premise Network (Gerszberg 64-25-34-13-5);
34. ISD Wireless Network (Gerszberg 65-26-35-14-6);
35. ISD Controlled Set-Top Box (Gerszberg 66-27-15-7);
36. Integrated Remote Control and Phone (Gerszberg 67-28-16-8);
37. Integrated Remote Control and Phone User Interface (Gerszberg 68-29-17-9);
38. Integrated Remote Control and Phone Form Factor (Gerszberg 69-30-18-10);
39. VideoPhone Mail Machine (Attorney Docket No. 3493.73170);
40. Restaurant Ordering Via VideoPhone (Attorney Docket No. 3493.73171);
41. Ticket Ordering Via VideoPhone (Attorney Docket No. 3493.73712);
42. Multi-Channel Parallel/Serial Concatenated Convolutional Codes And Trellis Coded Modulation Encode/Decoder (Gelblum 4-3);
43. Spread Spectrum Bit Allocation Algorithm (Shively 19-2);
44. Digital Channelizer With Arbitrary Output Frequency (Helms 5-3);
45. Method And Apparatus For Allocating Data Via Discrete Multiple Tones (filed Dec. 22, 1997, Attorney Docket No. 3493.20096—Sankaranarayanan 1-1);
46. Method And Apparatus For Reducing Near-End Cross Talk In Discrete Multi-Tone Modulators/Demodulators (filed Dec. 22, 1997, Attorney Docket No. 3493.37219—Helms 4-32-18).

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A central office interface between a multiple access link to a subscriber premises and a local carrier network:
   a digital loop carrier with a digital interface to permit access to a digital backplane of said digital loop carrier;
   a controller with a modulator/demodulator configured to apply data corresponding to multiple voice call sessions from said link to said digital interface, and to apply data corresponding to said multiple voice call sessions from said digital interface to said link:
   said multiple access link being established over a single twisted pair metallic interface;
      wherein said controller is connected to another digital network; and
      said controller is configured to add a new call to said multiple voice call session in response to signaling data received through said another digital network.

2. A central office interface between a multiple access link to a subscriber premises and a local carrier network:
   a digital loop carrier with a digital interface to permit access to a digital backplane of said digital loop carrier;
   a controller with a modulator/demodulator configured to apply data corresponding to multiple voice call sessions from said link to said digital interface, and to apply data corresponding to said multiple voice call sessions from said digital interface to said link:
   said multiple access link being established over a single twisted pair metallic interface;
      wherein said controller is connected to another digital network; and
      said controller is configured to add a new call to said multiple voice call session in response to signaling data received through said link, said controller being further configured to route selectively said new call through said another digital network responsively to signaling data received through said link.

3. A central office interface between a multiple access link to a subscriber premises and a local carrier network:
   a digital loop carrier with a digital interface to permit access to a digital backplane of said digital loop carrier;
   a controller with a modulator/demodulator configured to apply data corresponding to multiple voice call sessions from said link to said digital interface, and to apply data corresponding to said multiple voice call sessions from said digital interface to said link:
   said multiple access link being established over a single twisted pair metallic interface;
      wherein said controller is connected to another digital network; and
      said controller is configured to add a new call in said multiple voice call session in response to signaling data received through said link, said controller being further configured to route selectively said new call through said another digital network responsively to signaling data received through said link;
      further comprising a data storage unit; and
      said controller being further configured to route said new call responsively to signaling data and subscriber data corresponding to said call, said subscriber data indicating services permitted for a calling party corresponding to said call.

* * * * *